March 12, 1957  R. E. POWERS  2,784,406
HEAD CONSTRUCTION FOR FASTENER DRIVER
Filed Aug. 9, 1954
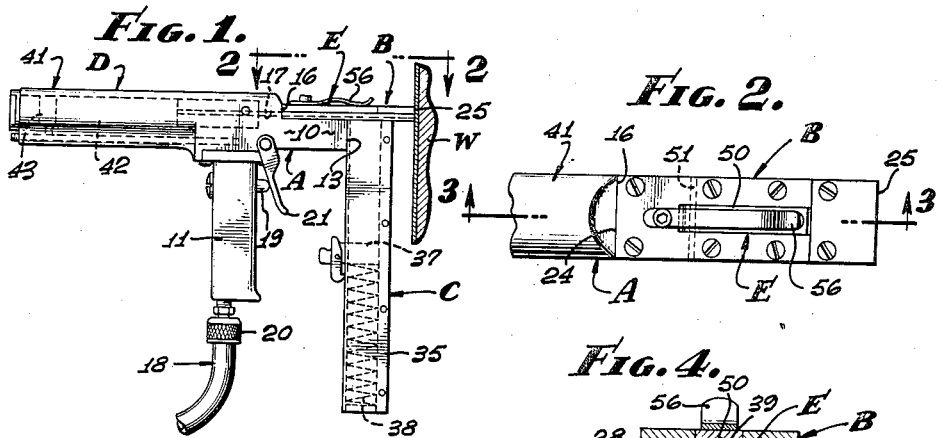
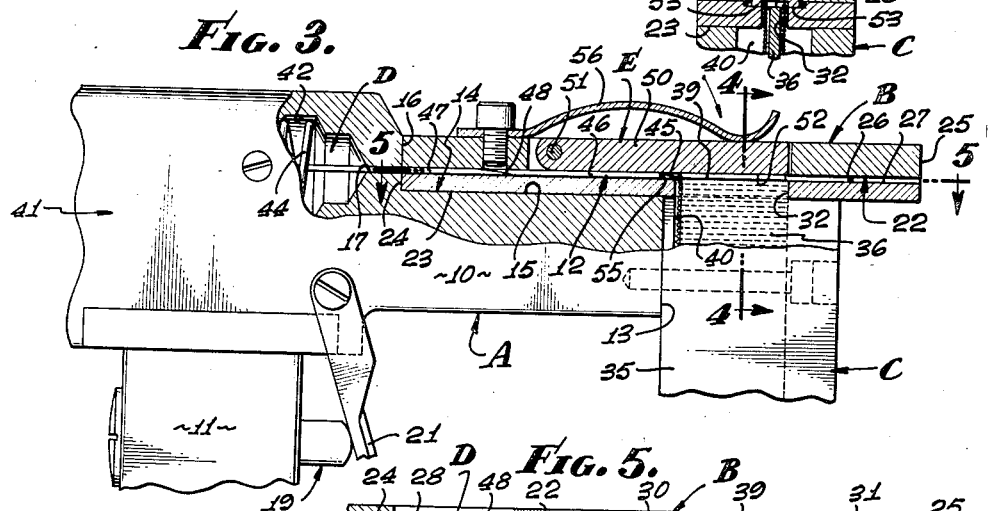
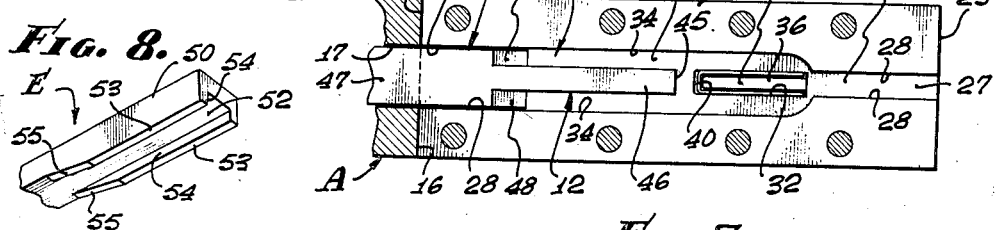
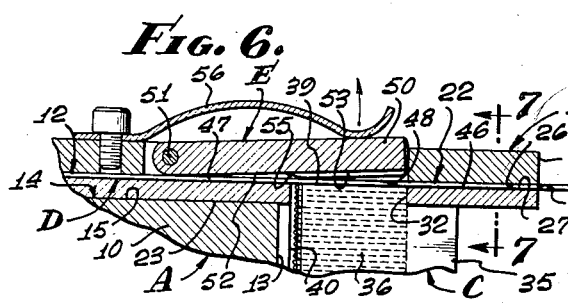
INVENTOR.
RICHARD E. POWERS
BY
AGENT.

United States Patent Office 2,784,406
Patented Mar. 12, 1957

2,784,406

HEAD CONSTRUCTION FOR FASTENER DRIVER

Richard E. Powers, Monterey Park, Calif., assignor to Powers Wire Products Company, Inc., Monterey Park, Calif., a corporation of California Application August 9, 1954, Serial No. 448,673

11 Claims. (Cl. 1—49)

This invention has to do with a device for driving fasteners and is more particularly concerned with the head construction of such a device, it being a general object of the invention to provide a simple, practical, dependable and effective mechanism for handling fasteners such as nails, pins, tacks, staples and the like.

Stapling guns are used for driving fasteners of many types and sizes and are, in many instances, subject to becoming jammed or otherwise out of order. In the manufacturing of furniture and the crating of products of manufacture, fasteners in the form of nails and staples are commonly driven by guns into woods and the like, including hard and semi-hard woods. Therefore, specially designed fasteners are employed and guns of rugged construction are required. A typical fastener for such use is substantially elongate and slender in form and, therefore, the plunger or driving element of the gun is necessarily a slender part subject to bending and consequent failure. Further, there is a tendency for the fastener in ordinary guns to be mis-aligned so that they become jammed in the guideway of the gun. In order to clean the jammed fasteners from ordinary guns, shiftable closures have heretofore been provided in order to gain easy access to the interior parts of the gun including the fasteners and the guideway therefor. The present invention is concerned with a means which guides the fasteners to keep them from being mis-aligned, and with a structural relationship of parts that makes possible a more rugged plunger or driving element construction.

It is an object of this invention to provide a fastener handling gun and a head construction therefor, which is simple, compact and which serves to handle a supply of fasteners, such as nails or staples or the like, and which operates to drive the staples one at a time in an accurate and efficient manner.

Another object of this invention is to provide a guide means for fasteners or staples in a structure of the character referred to which involves a shiftable element adjacent and overlying the staple to be delivered by the gun. The guide means which is provided operates to guide the fastener or staple until it is completely carried by the guideway of the gun head from which the fastener is delivered into the work being acted upon by the gun.

It is another object of this invention to provide a head construction for a gun of the character described which includes a shiftable guide means for the fasteners or staples, which guide means moves to accommodate an enlarged portion of the plunger or driving element of the gun. The shiftable element not only acts to guide the staple as hereinabove set forth, but also acts to allow portions of the plunger to occupy the space originally occupied by the fastener or staple so that the plunger is continuously confined and guided by the head of the gun.

The various objects and features of my invention will be fully understood from the following detailed description of a typical preferred form and application of my invention, throughout which description reference is made to the accompanying drawings, in which:

Fig. 1 is a side view of a staple driving gun incorporating the construction of the present invention as the gun may be applied to drive staples into a piece of work. Fig. 2 is an enlarged plan view of the head portion of the gun taken as indicated by line 2—2 on Fig. 1. Fig. 3 is an enlarged detailed sectional view showing portions of the structure in elevation, being a view taken as indicated by line 3—3 on Fig. 2. Fig. 4 is a transverse sectional view taken as indicated by line 4—4 on Fig. 3. Fig. 5 is a longitudinal sectional view of the head taken as indicated by line 5—5 on Fig. 3. Fig. 6 is a sectional view of a portion of the structure shown in Fig. 3, showing the parts thereof in a position which the parts thereof take as a staple is driven into the work. Fig. 7 is a transverse sectional view taken as indicated by line 7—7 on Fig. 6, and Fig. 8 is a perspective view of a portion of the closure element which includes features of the present invention.

The fastener delivering gun of the present invention is adapted to be handled manually and involves, generally, a frame A having a body portion 10 and a handle or grip portion 11, a head B carried by the frame A and adapted to be engaged with a piece of work W, a magazine C for handling a supply of fasteners such as staples and cooperating with the head B so that the staples are handled and delivered by the head, operating means D having a plunger or driving element 12, and a shiftable guide means E for handling the staples and for accommodating the driving element of the means D so that it is continuously guided by the head B.

The frame A is a substantially rugged but light-weight part that carries the elements of the gun, and which is shaped to be conveniently handled by a person operating the gun. The frame A involves, generally, the body portion 10 and the handle or grip portion 11 above referred to. The body portion 10 is a simple elongate part having an opening or passage 17 extending longitudinally therethrough and is characterized by a flat front face 13 and a recess 14. The front face 13 is at the forward end of the body and is normal to the longitudinal axis of the body, while the recess 14 is formed by a flat seat 15 spaced laterally of the axis of the body and parallel therewith. The seat 15 extends rearwardly from the face 13 to a shoulder 16 where the passage 17 opens to the exterior of the body. The shoulder 16 is normal to the longitudinal axis of the body.

The handle or grip portion 11 is provided to give the person handling the gun a convenient means to hold the gun and is a simple grip of ordinary construction that projects from the body 10. In practice, the grip 11 may be substantially normal to the axis of the body 10 and may depend therefrom as clearly shown in Figs. 1 and 3 of the drawings. In structures of the type under consideration, it is common practice to provide a power connection 18 at the grip 11, such as a pneumatic hose or the like, and also to include a control means at the grip 11, such as a valve mechanism 19 or the like. It is to be understood that any suitable power means can be provided, such as an electrical power means, without altering the present invention. When compressed air is employed, as in the case illustrated throughout the drawings, the hose of the power connection 18 is attached to the grip 11 through a quick disconnect 20 and the valve mechanism 19 is under control of a finger operated trigger 21.

The head B is, in effect, an extension of the body 10 of the frame A and is provided to receive and deliver fasteners such as staples to the work W being acted upon by the gun. The head B is carried by the body 10 in the recess 14 and is provided with a longitudinal guideway 22 that extends through and opens at the ends of the head B. The head B has a bottom face 23 engaged with the seat 15, it has a rear end face 24 normal to the axis thereof and engaged with the shoulder 16, and it has a front end face 25 engageable with the work W.

In the particular form of the invention above, the guideway 22 is adapted to handle fasteners or staples that are U-shaped and formed of wire, or the like, having a pair of sharpened ends. The staples referred to are substantially elongate with straight parallel shanks joined by a curved back and, therefore, the guideway 22 is substantially rectangular in cross-section having relatively closely spaced upper and lower walls 26 and 27 and having relatively widely spaced side walls 28. It will be apparent how the guideway 22 can be proportioned so that it will readily pass the staples with clearance and will act upon the staples to guide them as they are delivered through the head B and from the gun.

In accordance with the present invention, the guideway 22 is continuous and has a plunger or driver guiding portion 30 and a staple guiding portion 31. The plunger guiding portion 30 is at the rear end of the head B and registers with the passage 17 above described, while the staple guiding portion 31 is at the forward end of the head B and opens to the exterior of the structure.

A fastener or staple receiving opening 32 extends laterally through the head B, which opening enters the bottom face 23 of the head and opens into the passage 22 through the lower wall 27 thereof. The staple receiving opening 32 may be rectangular in configuration, such as is common in devices of the type under consideration, so that the staples fed to the head B are properly guided and aligned with the passage 22 before they are engaged by the plunger or driver 12 of the mechanism. As shown throughout the drawings, the staple receiving opening is located intermediate the portions 30 and 31 of the guideway 22 and adjacent the staple guiding portion 31. As clearly shown in Fig. 3 of the drawings, the upper wall 26 of the guideway 22 is confined to the portions 30 and 31 thereof, leaving the guideway 22 opened upwardly and laterally intermediate the two end portions. The staple guiding portion as shown in Fig. 5 of the drawings, is of sufficient width to freely pass a fastener or the staple handled by the head B while the plunger guiding portion 30 is of increased width in order to accommodate the reinforced plunger or driver 12 hereinafter described. As shown in Fig. 5, the intermediate portion of the guideway 22 is provided with side walls 34 which are continuations of the side walls 28 of the plunger guiding portion 30, so that the plunger or driver 12 is continuously guided as it travels longitudinally of the head B.

The magazine C is adapted to handle a supply or stack of fasteners or U-shaped staples and involves, generally, a case 35 carried by the frame A, a guide 36 within the case 35, a follower 37 adapted to advance the fasteners or staples, and a feed spring 38 yieldingly urging the follower. The case 35 is carried by the front face 13 of the body 10 and is an elongate part that depends from the frame A. The case 35 is shell-like in form and the guide 36 is a core-like part that is substantially coextensive with the case 35 and is carried by one of the side walls thereof. As shown in Fig. 5 of the drawings, the case 35 and guide 36 are shaped so that a longitudinal passage 40 is formed, which passage conforms in general configuration to the U-shaped staples which are handled by the head B. The guide 36 enters the fastener or staple receiving opening 32 and terminates in a flat end 39 that occurs in the plane of the bottom wall 27 of the guideway 22. The follower 37 conforms with the configuration of and is slidably carried in the passage 40 and is yieldingly urged toward the head B by the feed spring 38. Means may be provided to prevent the follower 37 from entering the guideway 22. The fasteners or staples are inserted into the magazine C through the intermediate portion of the head B by pivoting the gate 50 to an open position and simply entering them into the passage 40 and compressing the spring 38.

The operating means D is provided to drive the fasteners or staples handled by the structure and, in addition to the plunger or driver 12, includes a cylinder and piston mechanism 41. The cylinder and piston mechanism 41 is carried by the body 10 of the frame A on the longitudinal axis thereof, and is under control of the trigger 21 hereinabove described. The mechanism 41 involves a cylinder 42 and a piston 43 slidably operable in the cylinder. The trigger 21 opens the valve mechanism 19 and allows a charge of compressed air to flow into the cylinder 42 thereby advancing the piston 43 in a manner common to guns of the type under consideration. A compression spring 44 is provided within the cylinder 42 ahead of the piston 43 to return the piston 43 to a retracted position.

The plunger or driver 12 of the operating means D is essentially an elongate element rectangular in cross-sectional configuration and terminates at its forward end in a flat fastener or staple driving face 45. The driver 12 has a driving head 46 at the forward end thereof which occupies the staple guiding portion 31 of the guideway 22 when the driver is in the extreme advanced position as shown in Fig. 6 of the drawings. The driver 12 also has an enlarged or widened stem 47 that is guided by the guide portion 30 of the guideway 22 and the side walls 34 of the intermediate portion of the head B. When the driver 12 is in the forward staple driving position as indicated in Fig. 6 of the drawings, the stem 47 substantially occupies the intermediate portion of the head B and is guided by the portion 30 and the walls 34 above described. It is a feature of this invention that the driver 12 is provided with an enlarged and reinforced stem, and that the forward or leading edge portion of the stem 47 is provided with an inclined cam or cam faces 48. The cam faces 48 are pitched upwardly and rearwardly and are provided to shift the shiftable guide means E hereinafter described.

The shiftable guide means E in the case illustrated is shown in the form of a closure or gate 50 that is pivotally carried by the head B so that it normally occupies the upper intermediate portion of the head B. As shown, the gate 50 is elongate and is shiftably engaged with the head B by means of a pivot pin 51. The gate 50 has a face 52 that normally occurs in the plane of the upper wall 26 so that it forms a continuation of the guideway 22. Opposite the fastener receiving passage 32 the gate 50 is provided with a pair of laterally spaced parallel ribs 53 that depend from the face 52. The ribs 53 have inner walls 54 that form continuations of the walls 28 of the guideway portion 31. It is a feature of this invention that the gate 50 is provided with a cam face and as shown the ribs are provided with inclined cam faces 55 that cooperate with the cam faces 48 above referred to, which are provided on the driver 12. By providing the cooperating cam faces 55 and 48, the gate 50 is shifted or moved so that the enlarged portion of the driver 12 can advance into the intermediate portion of the head B to be guided by the side walls 34. A spring 56 is provided to yieldingly hold the gate 50 in a down or normal position where it forms a continuation of the guideway 22 and thereby guides the staples handled by the gun and also guides the driver 12 of the gun.

From the foregoing it will be apparent that I have provided an extremely simple head construction for a staple driver or gun, which construction adequately guides or controls the movement of the staples and also guides the driver. With the construction provided the driver is provided with a stem of enlarged proportions so that it is very rugged and will not bend or become deformed under working conditions. It will be apparent how the inner walls 55 on the ribs that depend from the gate 50 act to guide the staples as they are initially severed from the supply thereof, so that they are held in accurate alignment as they enter the staple guiding portion 31 of the head B.

It will also be apparent how the gate 50, when it is in the normal or down position under influence of the spring 56, adequately guides the head of the driver 12. It will also be apparent how the gate 50 shifts or moves upwardly as indicated by the arrow in Fig. 6 of the drawings, so that the stem 47 of the driver 12 is allowed to pass under the ribs 53 to be guided by the side walls 34 of the intermediate portion of the head. It will also be apparent that the gate 50 and head B may be so related that the gate will shift downwardly instead of upwardly as described or so that the gate will shift laterally.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A fastener driving device of the character described including, a frame, an elongate head carried by the frame and having a longitudinal guideway having a fastener guiding portion and an enlarged driver guiding portion and with walls adapted to handle fasteners, a lateral fastener receiving opening through the head and entering the guideway at one wall thereof adjacent the fasteners, an operating means including an elongate driver operable in the enlarged portion of the guideway to engage the fasteners at the said opening and then drive the fasteners, there being a guide opening in the head opposite the staple receiving opening and entering the driver guiding portion of the guideway, and a shiftable guide means carried in the latter opening and receiving and guiding the fasteners and guiding said driver and shifting to allow for operation of an enlarged portion of the driver.

2. A fastener driving device of the character described including, a frame, an elongate head carried by the frame and having a longitudinal guideway having a fastener guiding portion and an enlarged driver guiding portion, a lateral fastener receiving opening through the head and entering the guideway adjacent the fastener guiding portion, an operating means including an elongate driver having a driving head operable in the fastener guiding portion of the guideway and having an enlarged stem operable in the driver guiding portion of the guideway, there being a guide opening in the head opposite the staple receiving opening and entering the driver guiding portion of the guideway, and a shiftable guide means carried in the latter opening and receiving and guiding the fasteners and guiding the driving head and shifting to allow for operation of the stem.

3. A fastener driving device of the character described including, a frame, an elongate head carried by the frame and having a longitudinal guideway having a fastener guiding portion and an enlarged driver guiding portion, a lateral fastener receiving opening through the head and entering the guideway adjacent the fastener guiding portion, an operating means including an elongate driver having a driving head operable in the fastener guiding portion of the guideway and having an enlarged stem operable in the driver guiding portion of the guideway, there being a guide opening in the head opposite the staple receiving opening and entering the driver guiding portion of the guideway, and a shiftable guide means carried in the latter opening and including ribs forming continuations of the walls of the fastener guiding portion of the guideway, said guide means guiding the fasteners and driving head and being shifted by movement of the driver to allow the stem of the driver to advance in the guideway.

4. A fastener driving device of the character described including, a frame, an elongate head carried by the frame and having a longitudinal guideway having a fastener guiding portion and an enlarged driver guiding portion, a lateral fastener receiving opening through the head and entering the guideway adjacent the fastener guiding portion, an operating means including an elongate driver having a driving head operable in the fastener guiding portion of the guideway and having an enlarged stem operable in the driver guiding portion of the guideway, there being a guide opening in the head opposite the staple receiving opening and entering the driver guiding portion of the guideway, and a shiftable guide means carried in the latter opening and including, a face and ribs forming continuations of the walls of the fastener guiding portion of the guideway, and a cam face on the guide means and engaged by the driver to shift the guide means to allow the stem of the driver to advance in the guideway.

5. A fastener driving device of the character described including, a frame, an elongate head carried by the frame and having a longitudinal guideway having a fastener guiding portion and an enlarged driver guiding portion, a lateral fastener receiving opening through the head and entering the guideway adjacent the fastener guiding portion, an operating means including an elongate driver having a driving head operable in the fastener guiding portion of the guideway and having an enlarged stem operable in the driver guiding portion of the guideway, there being a cam face on the driver, and there being a guide opening in the head opposite the staple receiving opening and entering the driver guiding portion of the guideway, and a shiftable guide means carried in the latter opening and including, a face and ribs forming continuations of the walls of the fastener guiding portion of the guideway, and a cam face on the guide means and engaged by the cam face on the driver to shift the guide means to allow the stem of the driver to advance in the guideway.

6. A fastener driving device of the character described including, a frame, an elongate head carried by the frame and having a longitudinal guideway having a fastener guiding portion and an enlarged driver guiding portion, a lateral fastener receiving opening through the head and entering the guideway adjacent the fastener guiding portion, an operating means including an elongate driver having a driving head operable in the fastener guiding portion of the guideway and having an enlarged stem operable in the driver guiding portion of the guideway, there being a guide opening in the head opposite the staple receiving opening and entering the driver guiding portion of the guideway, a shiftable guide means carried in the latter opening and including ribs forming continuations of the walls of the fastener guiding portion of the guideway to guide the driving head, said guide means being shifted by movement of the driver to allow the stem of the driver to advance in the guideway, and a spring yieldingly urging the guide means into a normal fastener and driving head guiding position.

7. A fastener driving device of the character described including, a frame, an elongate head carried by the frame and having a longitudinal guideway having a fastener guiding portion and an enlarged driver guiding portion, a lateral fastener receiving opening through the head and entering the guideway adjacent the fastener guiding portion, an operating means including an elongate driver having a driving head operable in the fastener guiding portion of the guideway and having an enlarged stem operable in the driver guiding portion of the guideway, there being a guide opening in the head opposite the staple receiving opening and entering the driver guiding portion of the guideway, a shiftable guide means carried in the latter opening and including, a face and ribs forming continuations of the walls of the fastener guiding portion of the guideway to guide the driving head, and a cam face on the guide means and engageable with the driver to shift the guide means to allow the stem of the driver to advance in the guideway, and a spring yieldingly urging the guide means into a normal fastener and driving head guiding position.

8. A fastener driving device of the character described including, a frame, an elongate head carried by the frame and having a longitudinal guideway having a fastener guiding portion and an enlarged driver guiding portion, a lateral fastener receiving opening through the head and entering the guideway adjacent the fastener guiding portion, an operating means including an elongate driver having a driving head operable in the fastener guiding portion of the guideway and having an enlarged stem operable in the driver guiding portion of the guideway, there being a guide opening in the head opposite the staple receiving opening and entering the driver guiding portion of the guideway, and a shiftable guide means pivoted to the head and carried in the latter opening and including ribs forming continuations of the walls of the fastener guiding portion of the guideway to guide the driving head, said guide means being shifted by movement of the driver to allow the stem of the driver to advance in the guideway.

9. A fastener driving device of the character described including, a frame, an elongate head carried by the frame and having a longitudinal guideway having a fastener guiding portion and an enlarged driver guiding portion, a lateral fastener receiving opening through the head and entering the guideway adjacent the fastener guiding portion, an operating means including an elongate driver having a driving head operable in the fastener guiding portion of the guideway and having an enlarged stem operable in the driver guiding portion of the guideway, there being a guide opening in the head opposite the staple receiving opening and entering the driver guiding portion of the guideway, and a shiftable guide means pivoted to the head and carried in the latter opening and including, a face and ribs forming continuations of the walls of the fastener guiding portion of the guideway to guide the driving head, and a cam face on the guide means and engageable with the driver to shift the guide means to allow the stem of the driver to advance in the guideway.

10. A fastener driving device of the character described including, a frame, an elongate head carried by the frame and having a longitudinal guideway having a fastener guiding portion and an enlarged driver guiding portion, a lateral fastener receiving opening through the head and entering the guideway adjacent the fastener guiding portion, an operating means including an elongate driver having a driving head operable in the fastener guiding portion of the guideway and having an enlarged stem operable in the driver guiding portion of the guideway, there being a guide opening the head opposite the staple receiving opening and entering the driver guiding portion of the guideway, a shiftable guide means pivoted to the head and carried in the latter opening and including ribs forming continuations of the walls of the fastener guiding portion of the guideway to guide the driving head, said guide means being shifted by movement of the driver to allow the stem of the driver to advance in the guideway, and a spring yieldingly urging the guide means into a normal fastener and driving head guiding position.

11. A fastener driving device of the character described including, a frame, an elongate head carried by the frame and having a longitudinal guideway having a fastener guiding portion and an enlarged driver guiding portion, a lateral fastener reciving opening through the head and entering the guideway adjacent the fastener guiding portion, an operating means including an elongate driver having a driving head operable in the fastener guiding portion of the guideway and having an enlarged stem operable in the driver guiding portion of the guideway, there being a guide opening in the head opposite the staple receiving opening and entering the driver guiding portion of the guideway, a shiftable guide means pivoted to the head and carried in the latter opening and including, a face and ribs forming continuations of the walls of the fastener guiding portion of the guideway to guide the driving head, and a cam face on the guide means and engaged by the driver to shift the guide means to allow the stem of the driver to advance in the guideway, and a spring yieldingly urging the guide means into a normal fastener and driving head guiding position.

References Cited in the file of this patent
UNITED STATES PATENTS

| | | |
|---|---|---|
| 1,845,186 | Raeburn | Feb. 16, 1932 |
| 1,962,874 | Polzer | June 12, 1934 |
| 2,117,741 | Polzer | May 17, 1938 |
| 2,117,744 | Polzer | May 17, 1938 |
| 2,160,514 | Polzer | May 30, 1939 |
| 2,420,830 | Maynard | May 20, 1947 |